United States Patent [19]

Schumacher et al.

[11] Patent Number: 5,104,211
[45] Date of Patent: Apr. 14, 1992

[54] SPLINED RADIAL PANEL SOLAR CONCENTRATOR

[75] Inventors: Kenny M. Schumacher, Satellite Beach; Bibb B. Allen; James D. Sturgis, both of Palm Bay, all of Fla.

[73] Assignee: Harris Corp., Melbourne, Fla.

[21] Appl. No.: 36,558

[22] Filed: Apr. 9, 1987

[51] Int. Cl.$^5$ .................. G02B 5/10; H01Q 15/20
[52] U.S. Cl. ..................... 359/853; 343/915; 343/912
[58] Field of Search ............. 350/613; 343/915, 912, 343/916

[56] References Cited

U.S. PATENT DOCUMENTS

| | | | |
|---|---|---|---|
| 2,806,134 | 9/1957 | Tarcici | 350/613 |
| 3,174,397 | 3/1965 | Sanborn | 343/915 |
| 3,406,404 | 10/1968 | Maier | 350/613 |
| 3,558,219 | 1/1971 | Buckingham et al. | 350/613 |
| 3,715,760 | 2/1973 | Palmer | 343/915 |
| 3,977,773 | 8/1976 | Hubbard | 350/613 |
| 4,315,265 | 2/1982 | Palmer et al. | 343/915 |
| 4,511,901 | 4/1985 | Westphal | 343/915 |

FOREIGN PATENT DOCUMENTS 1132987  7/1962  Fed. Rep. of Germany ...... 343/912

Primary Examiner—Jon W. Henry
Attorney, Agent, or Firm—Antonelli, Terry & Wands

[57] ABSTRACT

A splined radial panel solar collector structure approximates compound curvature surfaces by a three-dimensional arrangement of compactly stowable flat reflective panel segments mounted on a collapsible, space-deployable support structure of linear components. The support framework is formed of an umbrella-like framework of radially-extending ribs, struts and cords which deploy away from a central hub to form a system of radial trusses. A semirigid reflective surface structure is divided into sections of radial panels which are supported and shaped by an arrangement of radially tensioned flexible tape members aligned with the ribs. Connecting ties between the tapes and the ribs cause the tapes to assume a catenary curve. The ribs and flexible tape members are bridged circumferentially by sets of cords and ties to which the panels are joined. These cord and tie pairs place the panels in bending to effect a "splined" approximation of a parabola in the radial direction. The panels are arranged in a side-by-side relationship so as to be foldable in the circumferential direction during stowage. The panels are also discontinuous in the radial direction along lines connecting adjacent rib hinges in order to allow the reflective surface to be folded at the hinge points during stowage. As a result, each gore is effectively subdivided into a number of radial sections determined by the number of hinges along each rib and associated tape member. Openings are provided between the ends and sides of the panel strips so as to permit relative movement during folding and deployment, and to allow the panels to expand and contract with temperature change.

45 Claims, 15 Drawing Sheets

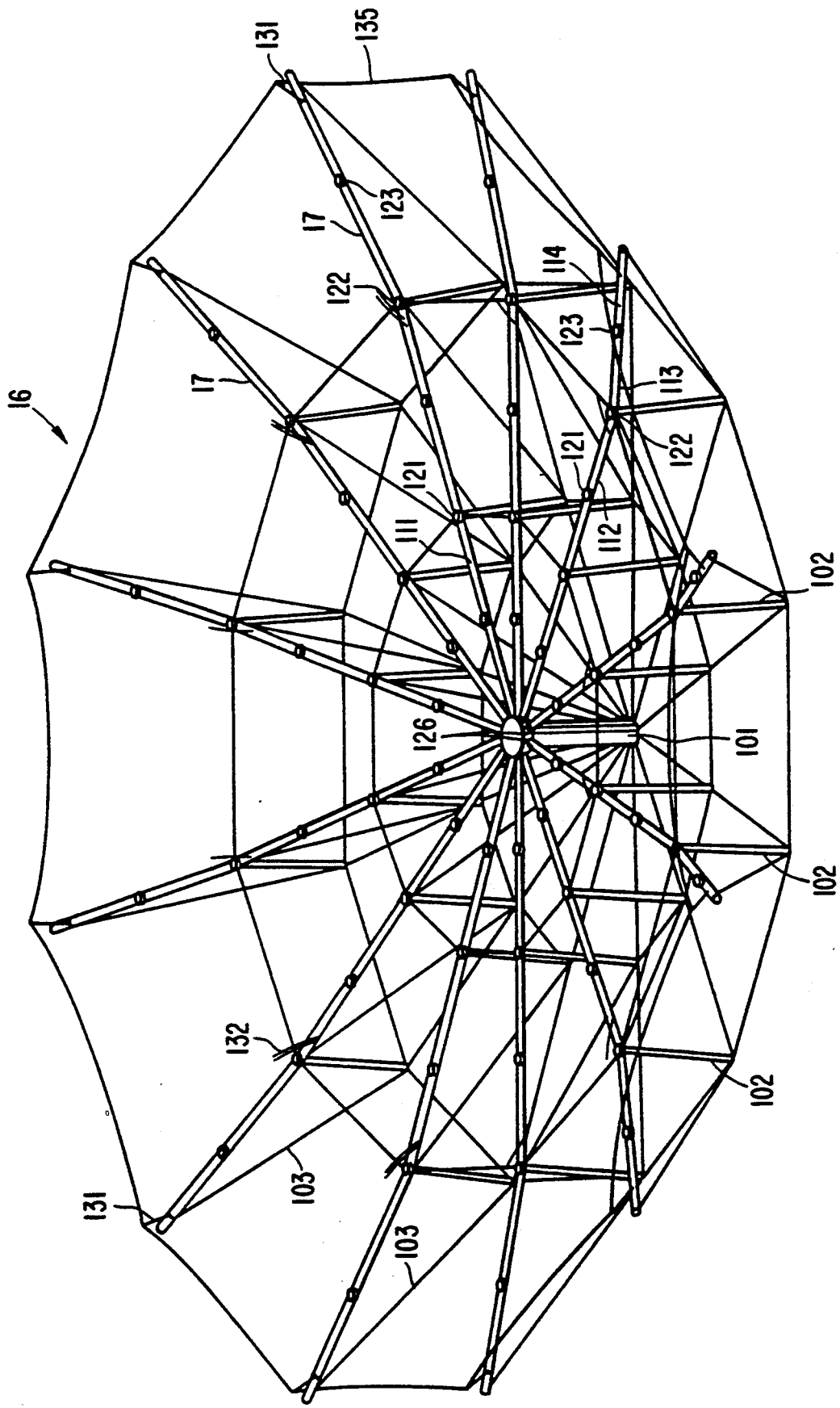

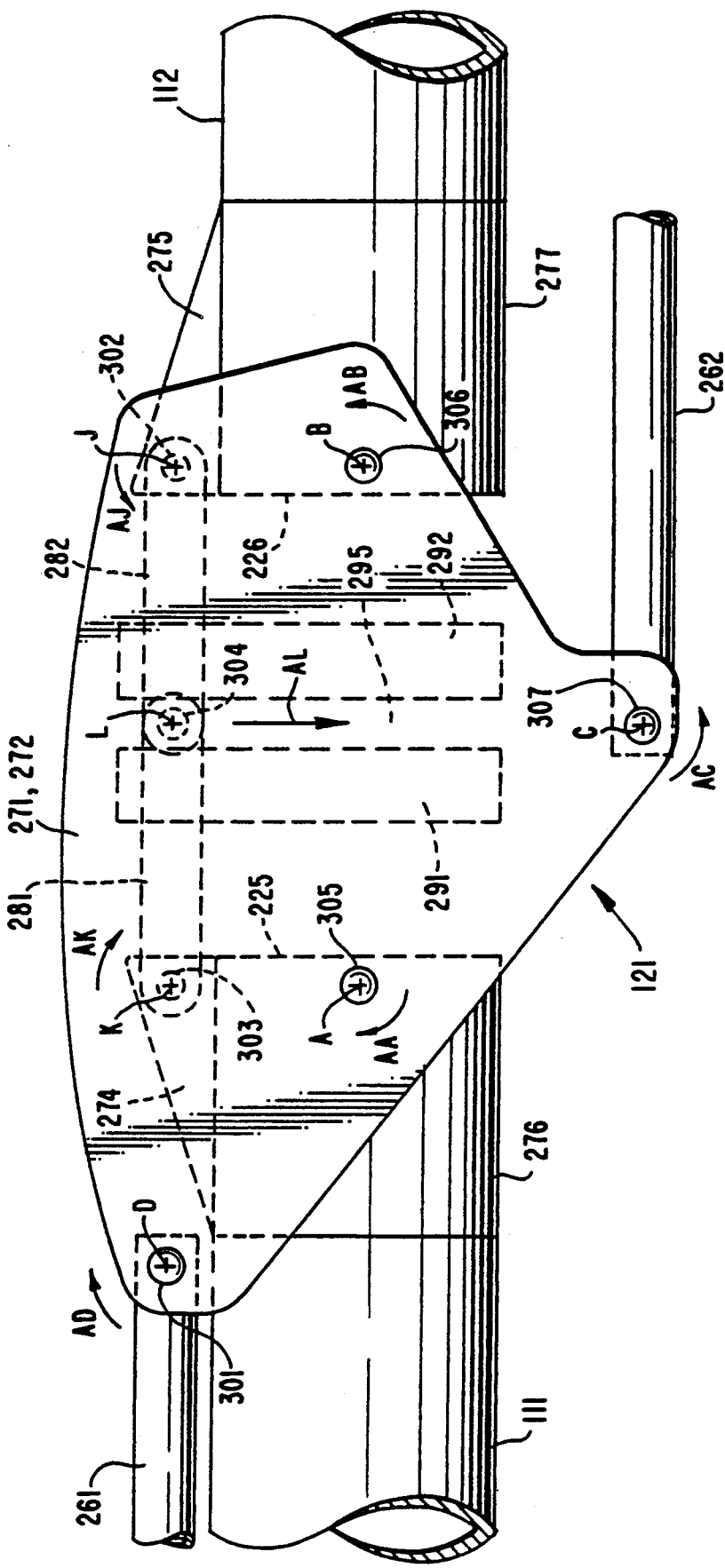

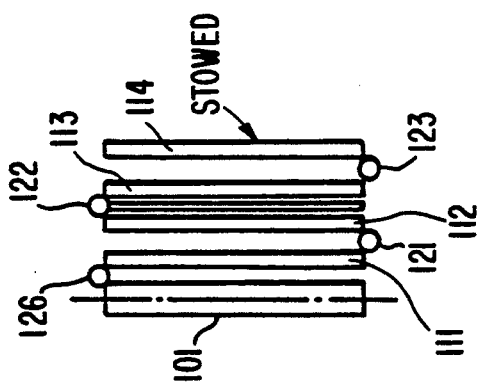
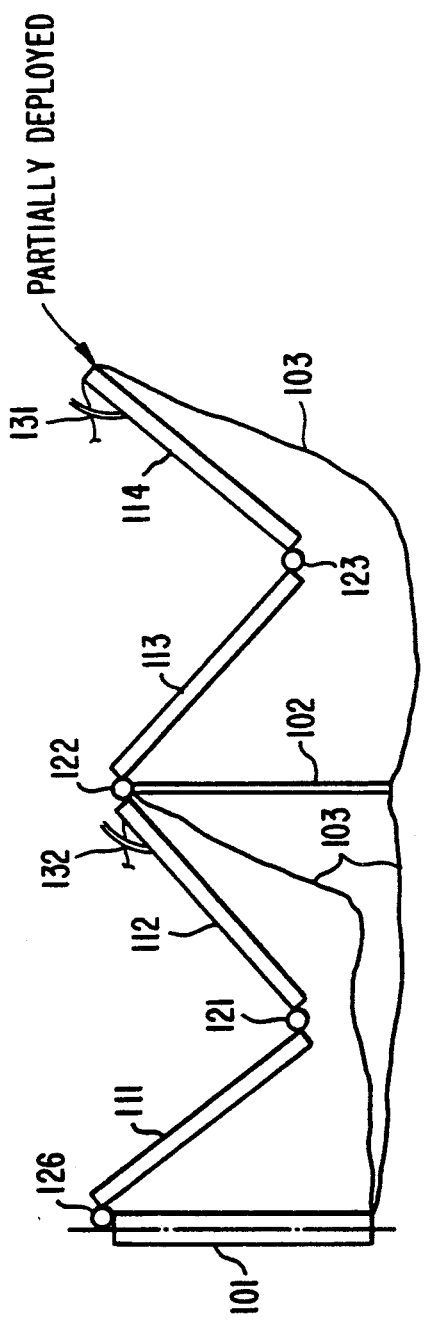

SPLINED RADIAL PANEL SOLAR CONCENTRATOR

FIELD OF THE INVENTION

The present invention relates in general an to energy directing apparatus and is particularly directed to a space deployable structure for supporting a plurality of solar energy reflecting panels in a splined radial configuration.

BACKGROUND OF THE INVENTION

With the availability of a practical extraterrestrial payload delivery system, science and engineering research and development facilities have accelerated their efforts to design and construct orbital systems (e.g. space station and orbiting defense weaponry), where advantage can be taken of weightlessness and the absence of the electromagnetic absorption and reflection characteristics of the earth's atmosphere. One source of power for such systems is expected to be large, solar energy devices which will use parabolic surfaces in order to concentrate the sun's energy for generating the vast quantities of electricity projected to be used.

Although a variety of solar concentrator designs have been proposed for use in space applications, most involve relatively large, bulky concentrator structures which are limited in potential for growth by their mass and stowed volume. A typical solar concentrator assembly incorporates a three-dimensional, compound-curved structure shaped to conform to a paraboloid of revolution. Because of its compound curve as well as its large size, the construction, packaging and successful deployment of such a structure is a costly and complex exercise. The manufacture of compound curved reflector elements involves complex tooling components and consequential high fabrication costs.

SUMMARY OF THE INVENTION

In accordance with the present invention the shortcomings of conventional compound curved solar energy concentrator assemblies are obviated by an improved solar collector structure through which compound curvature surfaces are approximated by a threedimensional arrangement of compactly stowable flat panel segments mounted on a collapsible, space-deployable support structure of linear components. The improved solar energy collector structure includes an underlying self-deployed support framework and a semirigid reflective surface structure attached to the support framework.

The support framework is formed of an umbrella-like framework of radially-extending ribs, which deploy away from a central hub. The ribs are preferably made of thin walled graphite tubes which are joined with an interconnected arrangement of radially extendible struts and cords to form a truss support structure. Each rib is hinged at a plurality of locations to permit the ribs to be folded into a compact stowed configuration. When fully deployed the framework becomes a system of radial trusses the depth and component sizes of which can be tailored to meet application requirements.

The semirigid reflective surface structure is divided into gores or sections of radial panels which are supported by an arrangement of flexible quartz and graphite tape members aligned with the radial ribs. The tape members are maintained in tension by anchoring the tapes to standoffs located at outer ends of the ribs and causing a resultant force to be imparted to each tape along its longitudinal or radial direction toward the apex of the structure. Connecting ties between the tapes and the ribs at a plurality of locations in the radial direction cause the tapes to assume a catenary curve. The ribs and flexible graphite tape members are bridged circumferentially by a sets of cords and ties to which the panels are joined.

Each of the radial panels is comprised of a plurality of flat panel strips having substantial in-plane mechanical stiffness in the circumferential direction and being flexible in the longitudinal direction. The longitudinal dimension of each panel strip extends in the radial direction. The panel strips are arranged in a side-by-side relationship. This allows folding in the circumferential direction during stowage. The panels are also discontinuous in the radial direction along lines connecting adjacent rib hinges in order to allow the reflective surface to be folded at the hinge points during stowage. As a result, each gore is effectively subdivided into a number of radial sections determined by the number of hinges along each rib and associated tape member. Openings are provided between the ends and sides of the panel strips so as to permit relative movement during folding and deployment, and to allow the panels to expand and contract with temperature change.

Radially, the panel strips are drawn into a splined parabolic curve using the sets of flexible cords and ties. In the circumferential direction, the panel strips remain flat and approximate the paraboloid as a series of straight-line segments, each panel strip acting as a simply supported beam in bending. Each panel strip is supported and attached at endpoints thereof to a circumferentially extending cord that bridges the tape members. In addition, each panel strip is attached at intermediate points to cord members which serve as concentrated loads. As a consequence of these attachment points, in the radial direction each panel strip approximates the shape of a parabolic curve.

Circumferential curvature is established by bridging respective pairs of mutually aligned rib and tape members with circumferentially extending pairs of cord members which are joined by tensioned ties. One of the cord members of each pair is attached to the radially extending ribs; the other cord member interconnects the tape members. A plurality of tensioned ties interconnect the cord members at spaced apart locations distributed along the cord members. The panel strips are attached at these tie points. The panel strips remain flat circumferentially and approximate a paraboloid as a series of straight-line segments.

Attachment of the panel strips to the ties is effected by means of fasteners which permit relative radial translation between the ties and the panel strips, so that thermally induced changes in length do not distort the reflective surface. The fasteners also permit the panels to be installed and removed on an individual basis, so that localized repair or adjustment can be made without disturbing the entire surface.

Each reflective panel strip is preferably comprised of low mass graphite-epoxy (typically two layers of bidirectional graphite cloth impregnated with a compatible resin system) over which a reflective coating, such as vapor-deposited silver, is formed. The front or reflective side of the panel strip is made resin rich, resulting in a smooth glass-like substrate surface on which the silver reflective coating may be vapor deposited. An additional layer of a transparent material such as magnesium fluoride is then applied to the front surface to serve as a protective coating.

In its stowed configuration for launch, the structure is folded at the hinges of the support framework, with the ribs being retracted to a nested arrangement about the central hub. Because the ribs are retracted, structural cords are no longer in tension and do not impart shaping loads to the reflective panels. The panels strips assume their natural planar shape and are folded accordion style between the ribs. Compressible vibration absorbing snubbers are provided between adjoining panels to prevent the reflective surfaces from becoming damaged and to dampen transport vibrations.

BRIEF DESCRIPTION OF THE DRAWINGS

FIGS. 9A and 9B are respective perspective and side views of a deployable truss structure for the supporting the solar concentrator reflective surface shown in FIGS. 1 and 2;

FIGS. 10-12 are respective side, end and top views diagrammatically illustrating the configuration of a rib-to-rib hinge joint of the rib-truss section shown in FIGS. 9A and 9B;

FIG. 16 and 17 show the rib-truss support framework of FIGS. 9A and 9B in its partially deployed and stowed conditions, respectively;

DETAILED DESCRIPTION

Figure 1:
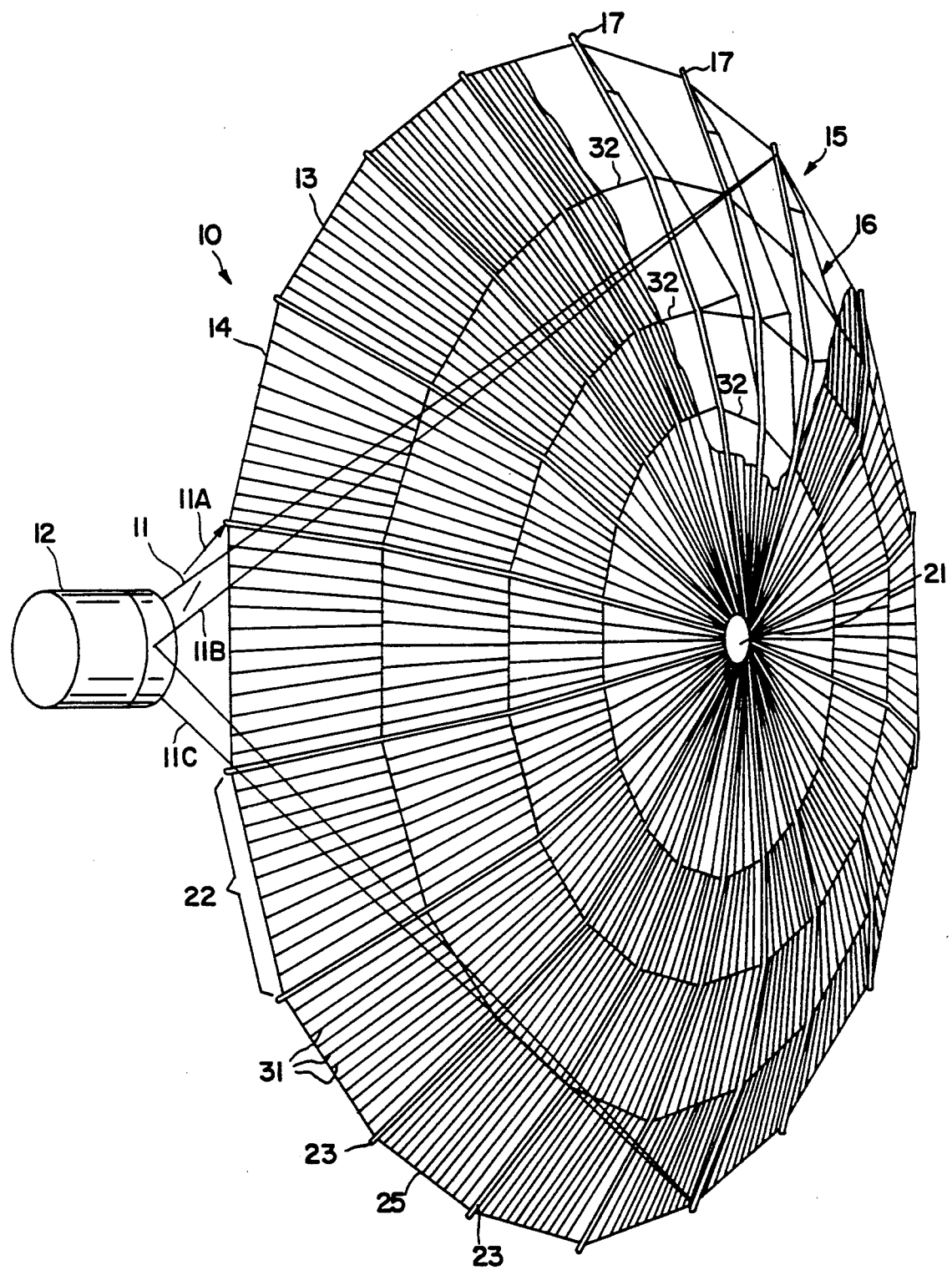
FIG. 1 is a diagrammatic perspective illustration of a space deployable splined radial panel concentrator in accordance with the preset invention.
Figure 2:
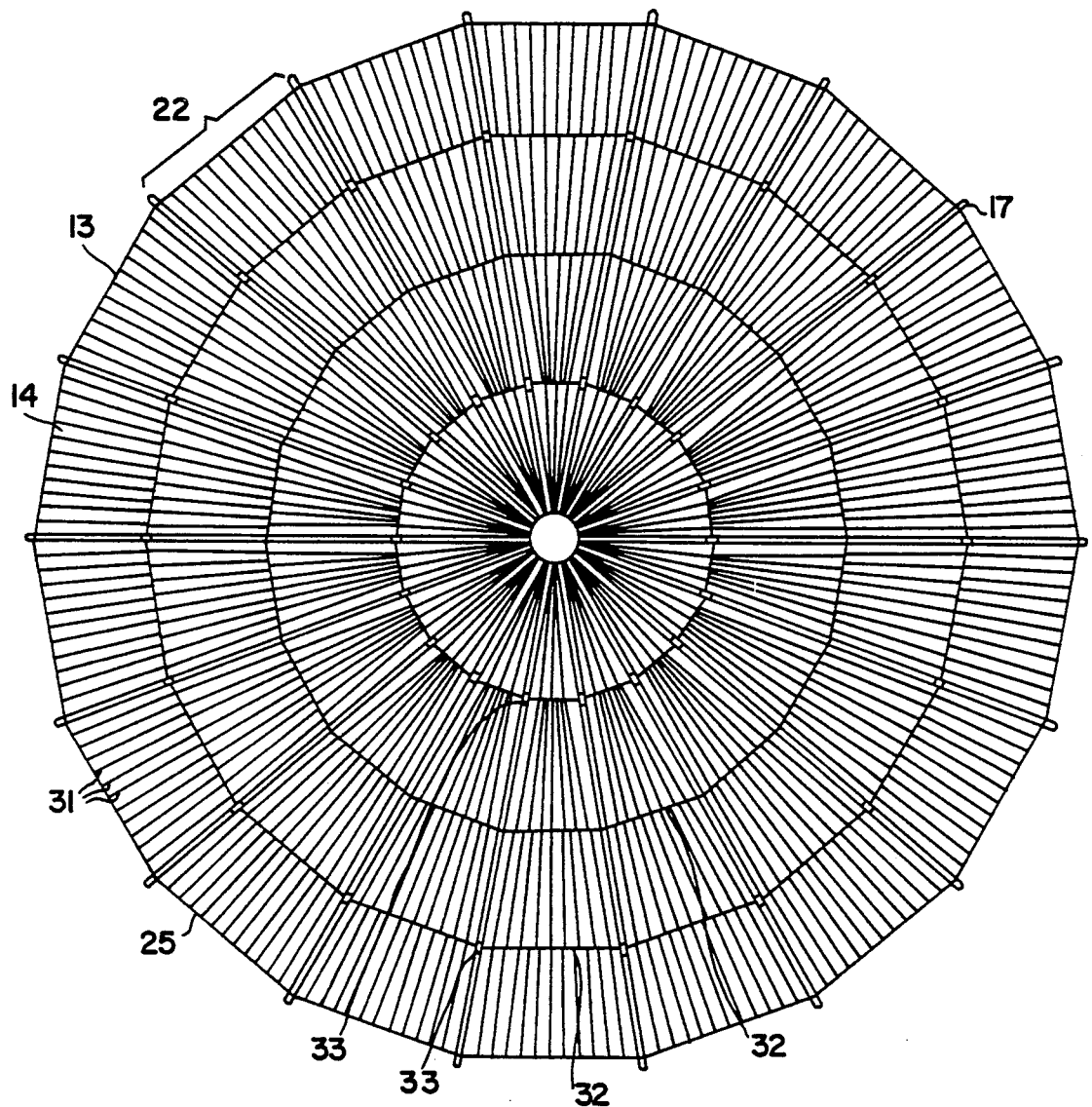
FIG. 2 is a diagrammatic front or axial view of the splined radial panel concentrator shown in FIG. 1.

Referring now to FIGS. 1 and 2 there are shown respective diagrammatic perspective and front (or axial) views of the compound curved, splined radial panel solar energy concentrator 10 in accordance with the present invention. FIG. 1 also illustrates a tripod structure 11 which is attachable to the circumferential perimeter of concentrator 10 and upon which a solar energy collector module (solar engine) 12 is mounted for receiving the rays that are focused by a semirigid reflective surface structure 13. Semirigid reflective surface structure 13 is a compound surface that is piecewise-approximated by a plurality of thin, flat reflective panel strips 14 which are supported on and foldable with an underlying collapsible, spacedeployable support framework 15, shown at partially broken away region 16 in FIG. 1. As will be described in detail below with reference to FIGS. 9A and 9B, support framework 15 is preferably formed of an umbrella-like arrangement of radiallyextending ribs 17 and interconnected truss structure, which deploys away from a central hub (not shown in FIGS. 1 and 2) located below the apex 21 of concentrator 10.

Semirigid reflective surface structure 13 is divided into a plurality (e.g. eighteen in the configuration shown) of gores or sections 22 of panel strips 14, which are supported by an arrangement of flexible quartz and graphite tape members 23 extending radially from apex 21 to circumferential perimeter 25. Tape members 23 are aligned with the radial ribs 17 of the underlying support framework 15 and are caused to assume a curvilinear (parabolic) contour by anchoring the tape members to standoffs (not shown in FIG. 1) located at outer ends of ribs 17 and placing each tape member in tension in the longitudinal or radial direction toward apex 21.

Each of the flat reflective panel strips 14 is generally rectangularly shaped, with its longitudinal dimension extending in the radial direction and its narrow dimension extending in the circumferential direction of reflective surface 13. The panel strips are arranged in side-by-side relationship, but with a slight separation therebetween, denoted by lines 31, so as to be foldable in the circumferential direction during stowage. The panel strips are also discontinuous (spaced apart from one another) in the radial direction along lines 32, in order to allow the reflective surface structure 13 to be folded in the radial direction (at the hinge locations 33 of the underlying support framework 15) during stowage. As a result, each gore is effectively subdivided into a number of radial sections (e.g. four in the configuration shown) determined by the number of hinges along each rib.

Figure 3:
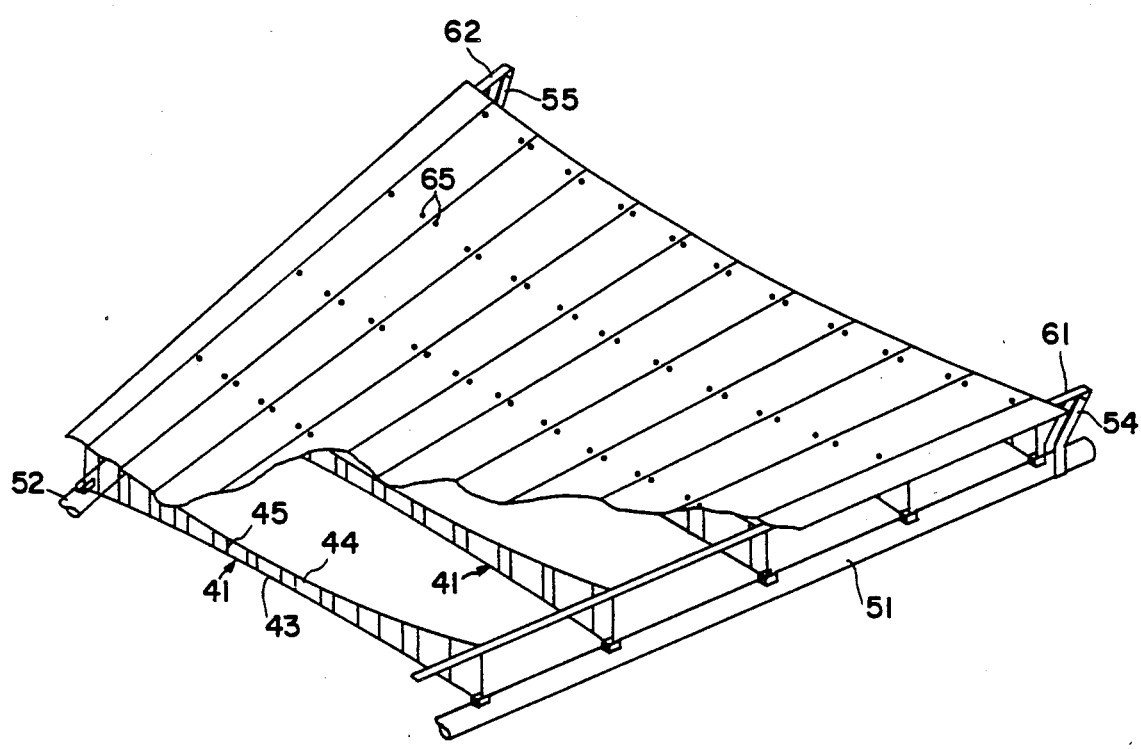
FIG. 3 is a partially cutaway perspective view of a perimeter portion of a section of the splined radial panel concentrator shown in FIG. 1.

Referring now to FIG. 3 there is shown a cutaway illustration of a circumferential perimeter portion of a panel section or gore 22. The flat reflective panel strips 14 are drawn into a splined parabolic curve using sets (pairs) 41 of flexible quartz-graphite cords 43 and 44 and tensioned ties 45 therebetween to circumferentially bridge respective pairs of mutually aligned rib and tape members. The bottom cord member 43 of each pair 41 is attached to radially extending ribs 51 and 52 (corresponding to radial ribs 17 shown in FIG. 1) of the underlying support framework and the top cord member 44 is attached to tape members 61 and 62 (corresponding to tape members 23 shown in FIG. 2), mutually aligned with ribs 51 and 52 and anchored to standoffs 54 and 55 at the ends thereof. A plurality of tensioned ties 45 interconnect cord members 43 and 44 at spaced apart locations distributed along the cord members. It is at these tie points 65 whereat the panel strips 14 are attached to the bridging cord structure.

Figure 4:
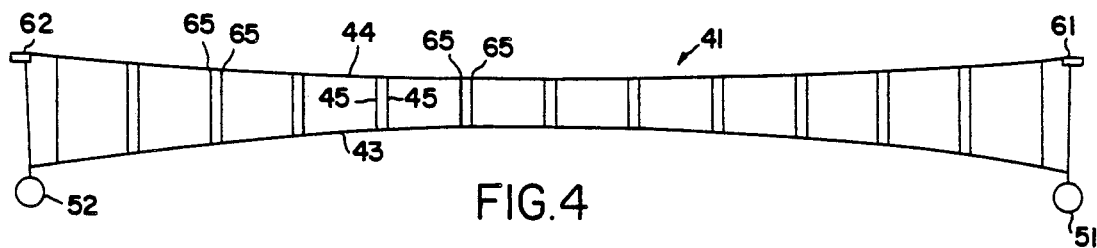
FIG. 4 shows a cross-section of the cord-tie structure of the panel section shown in FIG. 3.
Figure 5:
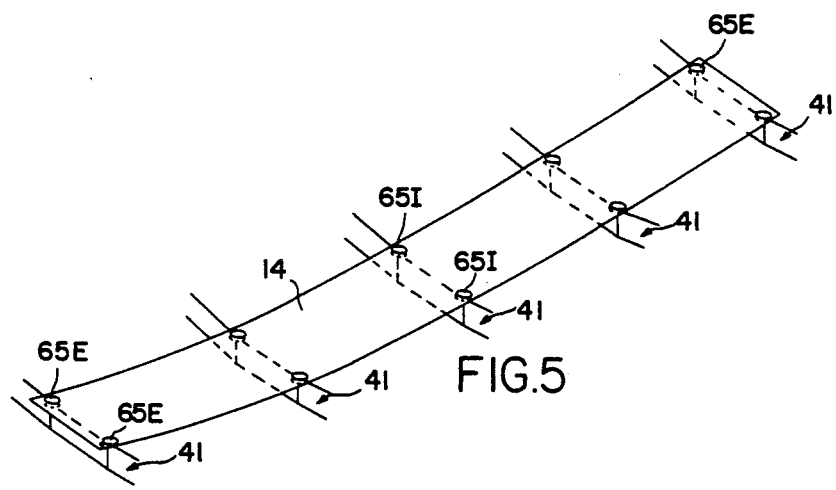
FIG. 5 is the manner of attachment of an individual splined radial to a plurality of cord-tie pairs.

A typical cross section of the bridging cord structure of a panel section or gore, depicting the manner in which the pairs of cord members 43 and 44 and tensioning ties 45 distributed therebetween create a piecewise circumferential curvature of the reflective panel surface 13, is shown in FIG. 4. As shown therein and also diagrammatically (for an individual panel) in FIG. 5, the attachment points 65 of the ties 45 to the panel strips 14 are distributed in pairs, corresponding to the locations of connection apertures (illustrated in detail in FIG. 6 to be described below) along the sides of adjacent panel strips 14. The lengths of the ties 45 are adjusted across the width of the gore so as to draw cord members 43 and 44 toward one another and thereby define the desired shape (catenary approximation of a parabola as viewed in cross section normal to the beam axis of the concentrator). Namely, in the circumferential direction, the panel strips remain flat and approximate a paraboloid as a series of straight-line segments. Each panel strip acts as a simply supported beam in bending. As diagrammatically illustrated in FIG. 5, each panel is supported and attached at endpoints 65E thereof to circumferentially extending cord 44 that bridges the tape members 61 and 62. In addition, each panel strip is attached at points 65 intermediate the end points to cord members which serve as concentrated loads. As a consequence of these attachment points, in the radial direction each panel strip takes on the shape of a parabolic curve.

Figure 6:
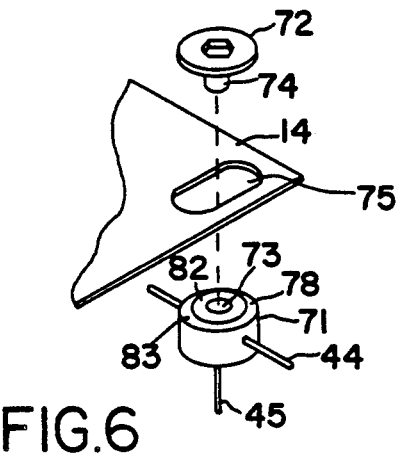
FIGS. 6, 7 and 7A are respective exploded partial perspective, side and perspective views of a fastener attachment of a panel.
Figure 7:
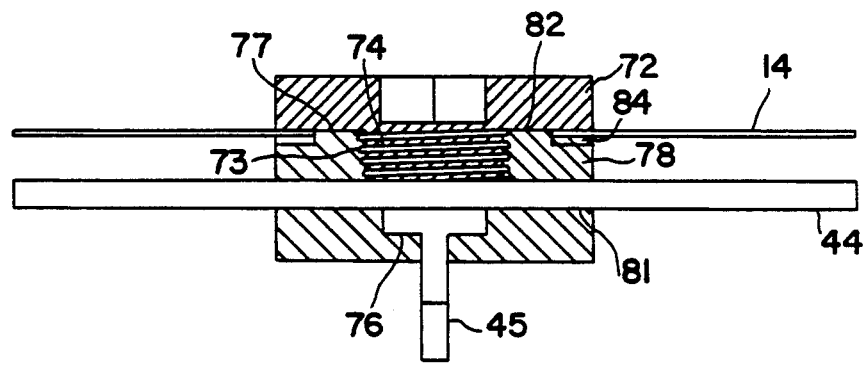

Attachment of the panel strip 14 to the tie points 65 is effected by means of fasteners 60, shown in detail in FIGS. 6 and 7. These fasteners permit relative radial translation between the ties and the panels so that thermally induced changes in length do not distort the reflective surface. They also permit the panels to be installed and removed on an individual basis, so that localized repair or adjustment can be made without disturbing the entire surface.

Figure 7A:
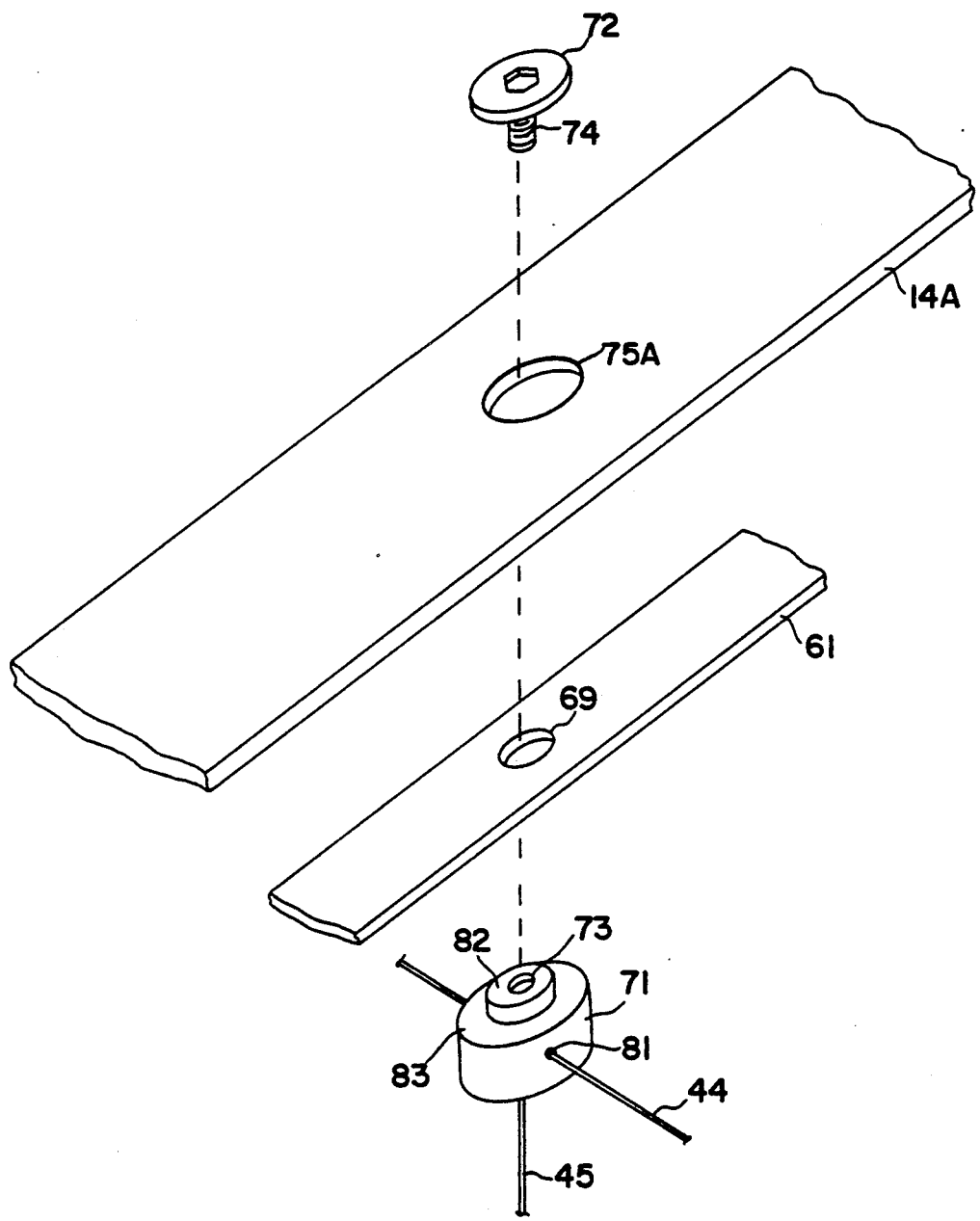

A respective fastener 60 is shown as comprising a lower cylindrical portion 71 and an upper cap portion 72. Lower portion 71 has an internally threaded bore 73 into which a threaded shank 74 of cap portion 72, that has been inserted through an oblong opening or aperture 75 in panel strip 14 or aperture 75A in gore edge panel strip 14A (shown in FIG. 7A), is screwed for securing panel strip 14 between lower portion 71 and cap portion 72. Tape 61 has a hole 69 aligned with aperture 75A in gore edge panel strip 14A. The lower cylinder portion 71 of a fastener has an axial slot 76 which extends from the internally threaded bore 73 and receives one end of a tie 45, so as to join the fastener to the tie. Lower cylindrical portion 72 also has a slot 81 transverse to slot 76 through which a top cord member 44 passes The upper surface of lower cylindrical portion 71 of the fastener has a raised circular lip region 82 which extends above a lower annular region 83, adjacent thereto The outer diameter of circular lip region 82 is sized to fit within oblong aperture 75 of panel strip 14 and permit slidable movement therein in the radial direction of the panel strip The circular lip region 82 is dimensioned to be slightly thicker than panel strip 14 (or the dual thickness of gore edge panel strip 14A and tape 61, as shown in FIG. 7A), so that, when tightened into the lower portion 71, the cap portion 72 contacts the lip region first, preventing the panel from becoming clamped by the fastener To minimize play in the vertical direction, a shim 84 may be fitted onto the lower annular region 83. As noted above, the oblong configuration of the apertures 75 permits radial translation between the tie attachment point and the panel so that thermally induced changes in length may occur without distorting the reflective surface of panel strip 14.

Figure 8:
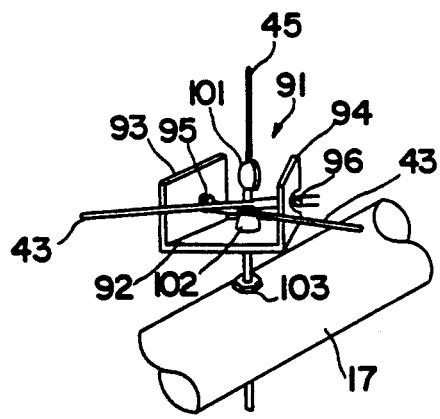
FIG. 8 is the manner of attachment of the catenary cord-tie structure to a support framework rib.

The manner in which the cord structure is attached to the ribs of the underlying support framework is illustrated in FIG. 8. As shown therein the lower cord members 43 of corresponding cord structure pairs of adjacent panel gores are anchored to a generally rectangular U-shaped bracket 91 having a baseplate 92 form which extend a pair of vertical sidewalls 93 and 94. Baseplate 92 has a truncated wedge shape so as to permit cord members 43 to pass by one another in an open region between sidewalls 93 and 94 to which the cord members are respectively anchored by end fasteners 95. Tie member 45 is anchored to rib 17 and baseplate 93 by way of fasteners 101, as shown.

As described above and as shown in FIG. 8, at the anchoring location of the catenary cord structure to each rib and tape member, the upper and lower cord members form an acute angle with the radial direction. As a consequence, with each tape member being anchored to a standoff at the outer perimeter of a respective rib, the tensile force imparted by the catenary cord structure at its connection points to the tape members and rib has a resultant component in the radial direction toward the apex 21, so that the tape members are placed in radial tension. By connection ties 45 between the tape members 23 and their underlying, mutually aligned ribs 17, the radially tensioned tape members 23 are drawn into a curvilinear (parabolic) radial configuration.

Each reflective panel strip 14 is preferably comprised of low mass graphite-epoxy (typically two layers of bidirectional graphite cloth impregnated with a compatible resin system) over which a reflective coating, such as vapor-deposited silver, is formed. The front or reflective side of the panel is made resin rich, resulting in a smooth glass-like substrate surface on which the silver reflective coating may be vapor deposited. An additional layer of a transparent material such as magnesium fluoride is then applied to the front surface to serve as a protective coating.

Referring now to FIG. 9A there is shown a diagrammatic illustration of the structural configuration of a multi-ribbed truss framework for supporting the reflective surface structure of the solar energy concentrator of the present invention. As shown therein, the support framework 16 has a plurality of ribs 17 extending radially from a central hub 101 and interconnected with an arrangement of struts 102 and truss cords 103. To permit compact stowage of the support framework and the panel sections of the solar concentrator, each of the ribs 17 is formed of a plurality of (e.g. four) rib segments 111, 112, 113, 114 which are joined together by a series of interconnecting hinge joints 121, 122, 123, 124. Each multi-segment rib 17 is joined to the hub 101 by a hub hinge joint 126. The outer end of each rib 17 has a standoff 131 to which a respective tape member of the solar concentrator structure is anchored, so that each tape member may be placed in tension in the radial direction by the action of the bridging circumferential cord and tie structure shown in FIG. 3, described above.

In the fully deployed condition of the support framework 16 shown in FIG. 9A, the hinge joints interconnect adjacent rib segments in a stable rigid condition to define a prescribed piecewise curvilinear shape of the respective rib as they extend away from the central hub 101. One or more of the hinge joints also receive and support respective struts 102 opposite ends of which are connected by a plurality of truss cord members 103, so that each rib is effectively self-supporting by virtue of its truss configuration. To further stabilize and define the intended shape of the support framework, a plurality of circumferentially extending hoop cord members 135 and diagonal cord members (not shown) are connected between circumferentially adjacent struts 102 at the respective opposite ends thereof and between the outer ends of respective outer tensioning standoffs 131 at the outer ends of each rib. Like ribs 17, the struts and cord members are preferably made of a lightweight, high tensile strength epoxy graphite composition material.

Figure 9B:
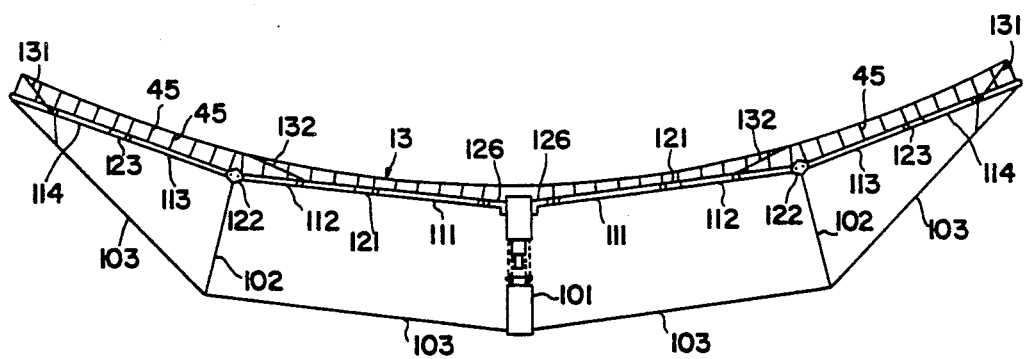

In FIG. 9B a diagrammatic side view of the multi-ribbed framework and the splined reflective surface supported thereby in their deployed states is shown as respective serial arrangements of tubular rib segments 111, 112, 113, 114 extending from hub 101 to the outer perimeter of the support structure. As shown in FIG. 9A and 9B, each of rib segments 111 is joined to hub 101 by way of hub hinge joints 126 and to rib segment 112 by rib-to-rib hinge joint 121. Rib-to-strut hinge joint 122 interconnects rib segments 112 and 113 and one of the struts 102, while rib-to-rib hinge point 123 interconnects rib segments 113 and 114. Each of rib segments 112 may also be provided with a respective standoff 132, similar to tensioning standoff 131 extending from rib segment 114, so as to facilitate the tiedown connecting of the tape members of the respective panel gores to the ribs 17 by way of a plurality of tie-down cords 45 distributed therebetween.

Figure 11:
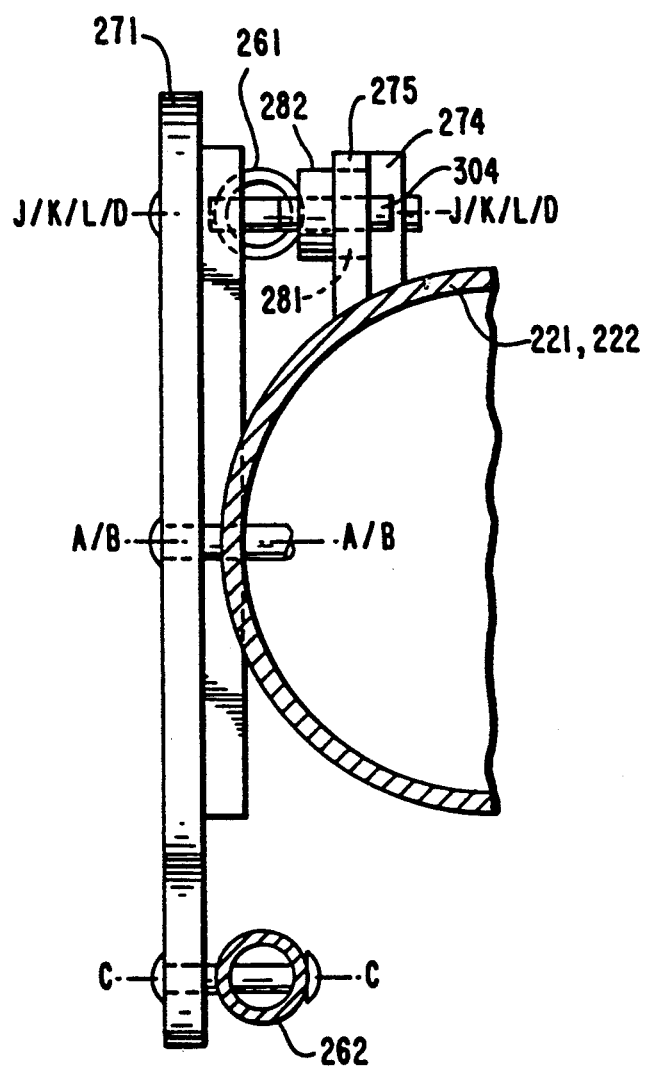
Figure 12:
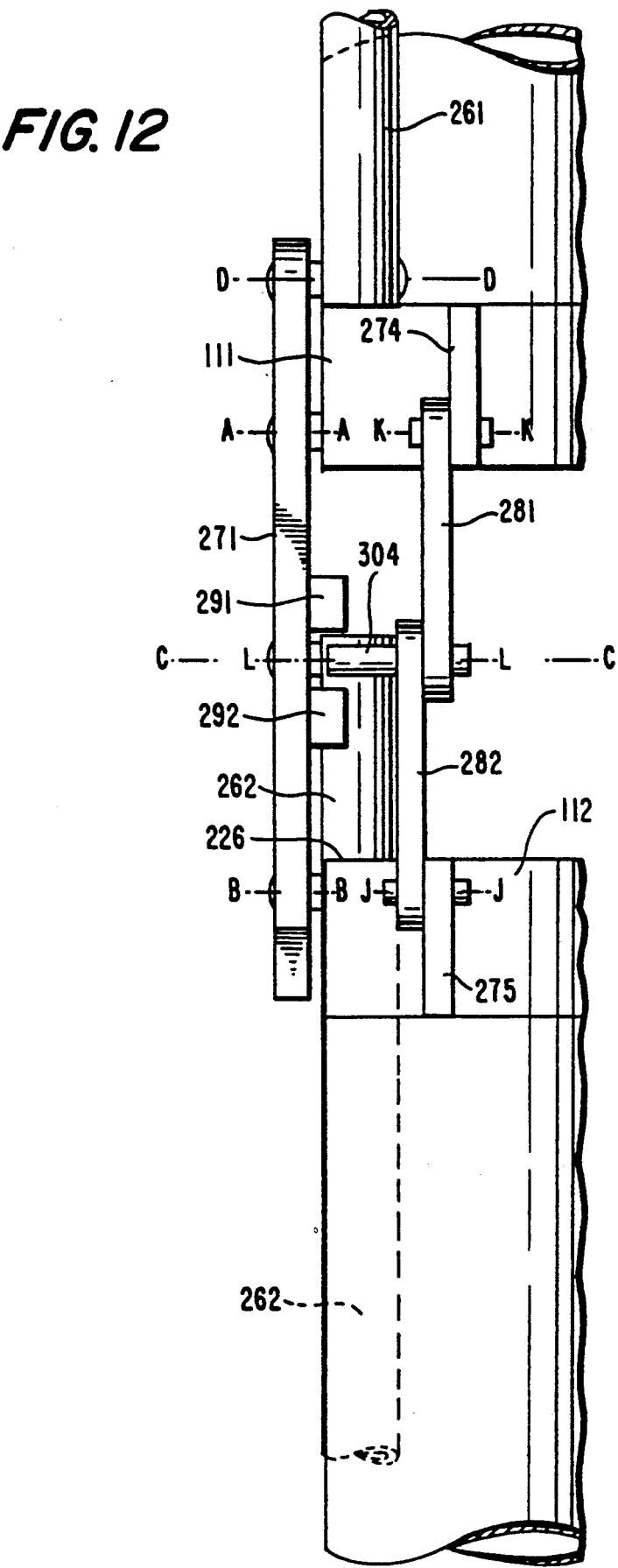

Referring now to FIGS. 10-12 respective side, end and top views of the structural configuration of a respective rib segment-to-rib segment hinge joint (specifically, hinge joint 121 which interconnects tubular rib segments 111 and 112) is shown in detail. Since each hinge joint is formed of a pair of symmetrical halves, only the near half of each joint is shown in order to simplify the drawings. As shown therein each hinge joint is comprised of a pair of spaced apart hinge plates 271, 272, separated by a distance sufficient to accommodate the diameters of tubular rib segments 111 and 112, and a set of connecting links 281 and 282 which extend between respective flanges 274 and 275 of a pair of sleeves 276 and 266 that are fitted on adjacent ends of rib segments 111 and 112. Each of plates 271 and 272 is further provided with a pair of raised land portions 291 and 292 on the interior faces thereof. Land portions 291 and 292 are spaced apart from one another to define guide slot 295 therebetween, in which a pin 304, that extends through axial bores L in each of connecting links, travels during rotation of links 281 and 282 about respective pin connections 303 and 302 rotatably extending through axial bores K and J in the opposite ends of links 281 and 282 and corresponding axial bores K and J in flanges 274 and 275. For purposes of simplifying the drawing, only pin 304 which extends through axial bores L and rides in slot 295 has been shown in detail. The remainder of the pins are identified by reference to axial lines therefor.

Plates 271 and 272 are rotatably connected to tubular rib members by respective pins 305 and 306 extending through axial bores A and B, respectively. A pair of rod members 261 is rotatably coupled to plates 271 and 272 by way of respective pins 301 extending through axial bores D, rod members 261 extending in spaced apart relationship with rib segment 221 to effectively form therewith part of a fourbar linkage which further includes the plates of the hinge joints at the opposite ends of rib segment 111. A pair of rod members 262 is rotatably coupled to pins 307 extending through axial bores C, rod members 262 extending in spaced apart relationship with rib segment 112 to effectively form therewith part of a fourbar linkage which further includes the plates of the hinge joints at the opposite ends of rib segment 112.

As pointed out above, the condition of the hinge joint depicted in FIGS. 10-12 corresponds to the stable, fully deployed condition of rib segments 111 and 112. When folded away from their fully deployed condition shown in FIGS. 10-12 rib segments 111 and 112 rotate in opposite directions (clockwise and counterclockwise, respectively, as denoted by arrows AA and AB in FIG. 10) about axial bores A and B in plate 271 and 272. Rotation arrows AD, AC, AK, AJ, and AL show the direction of rotation and translation of the other components of the hinge joint 205 in the course of stowage from its fully deployed condition. As noted previously, pin 304 travels in slot 295 so that connection link 281 rotates in a clockwise direction, while link 282 rotates in a counterclockwise direction as pin 304 travels down the slot, as viewed in FIG. 10.

Figure 13:
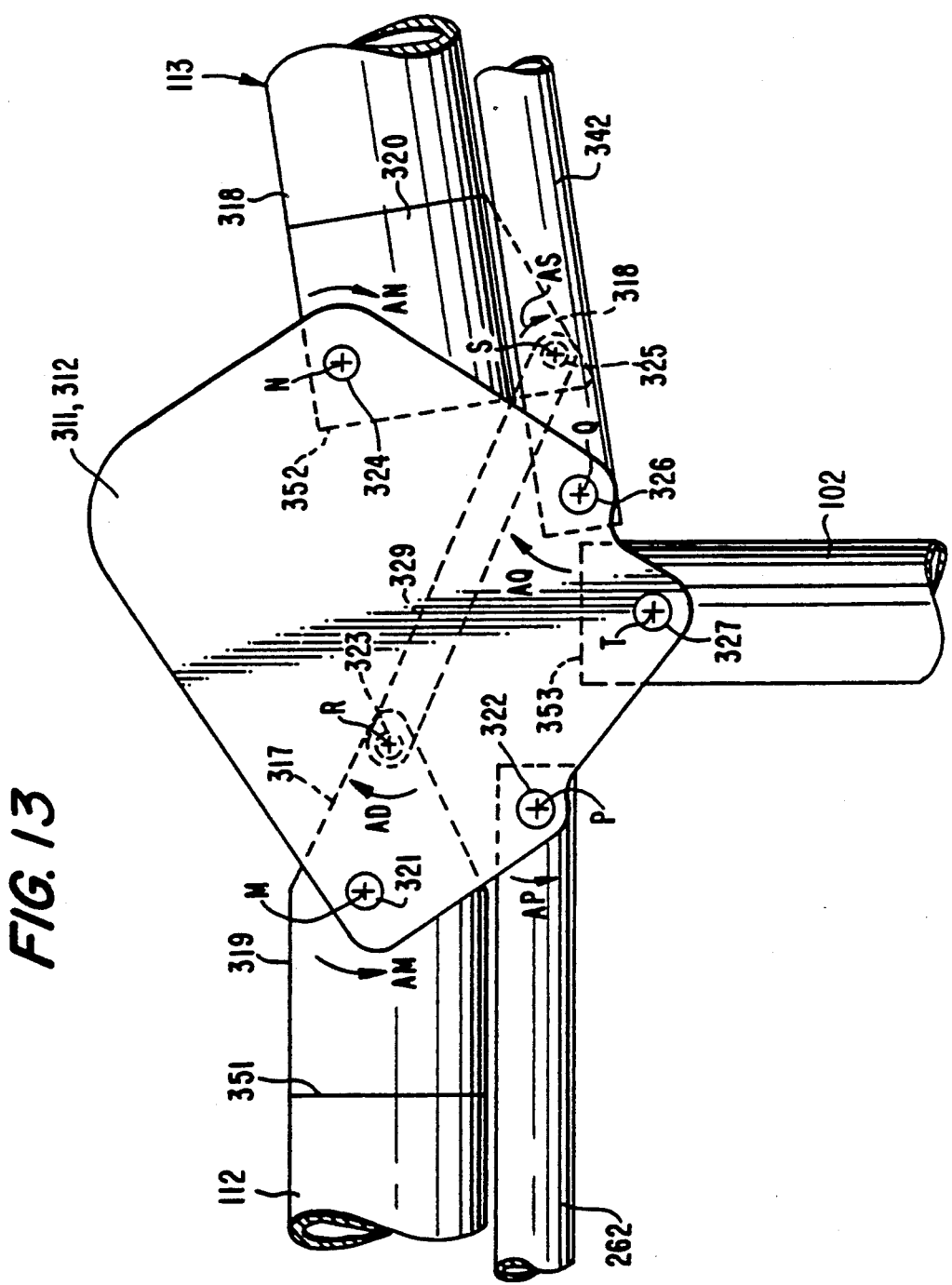
FIGS. 13-15 are respective side, end and tip views of the configuration of a rib-strut hinge joint of the rib-truss section shown in FIGS. 9A and 9B.
Figure 15:
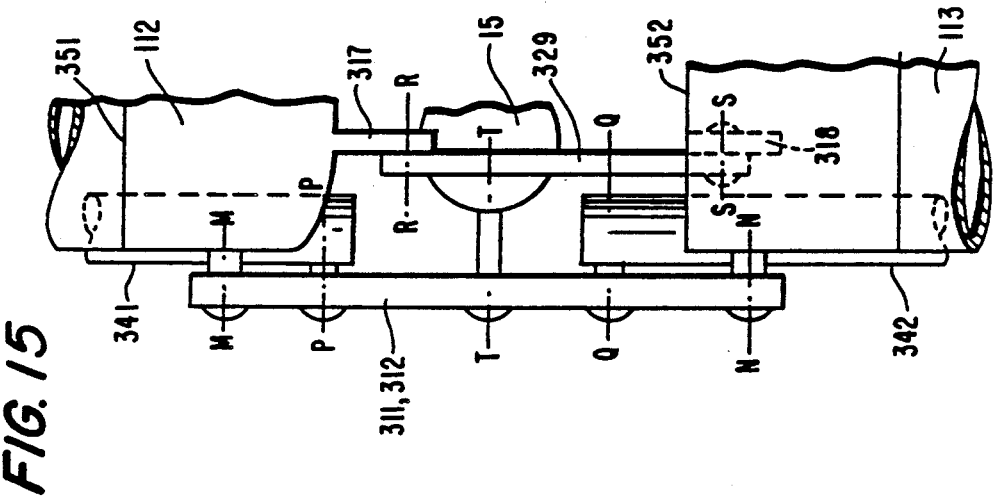
Figure 14:
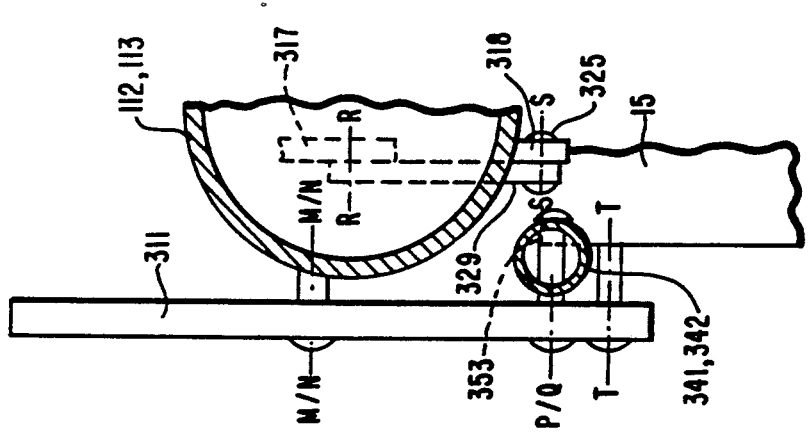

FIGS. 13-15 depict respective side, end and top views of the structural configuration of an individual rib segment-to-strut hinge joint, specifically hinge joint 122 which interconnects tubular rib segments 112 and 113 of the structural arrangement shown in FIGS. 9A and 9B, described above. Like the hinge joint shown in FIGS. 10-12, the rib segment-to-strut hinge joint is formed of a pair of symmetrical halves; accordingly, only one half of the joint has been shown in the Figures in order to simplify the drawings.

As shown therein each hinge joint is comprised of a pair of spaced apart plates 311, 312 which are separated by a distance sufficient to accommodate the diameters of tubular rib segments 112 and 113, and a connecting link 329 which extends between respective flanges 317 and 318 of a pair of sleeves 319 and 320 that are fitted on adjacent ends of rib segments 112 and 113. One end of link 329 is rotatably coupled to flange 317 by way of a pin 323 which extends through an axial bore R in link and in flange 317 of sleeve 319 on the end of tubular rib segment 112. (As was the case with illustration in FIGS. 10-12 pin 323 and the remaining pins and associated axial bores through which the pins pass are shown as axial lines in order to simplify the drawings.) The other end of link 329 is rotatably coupled to flange 318 by way of a pin 325 which extends through an axial bore S in flange 318 and link 329. Each of plates 311 and 312 is rotatably coupled to tubular rib segments 112 and 113, respectively, via pins 321 and 324 which extend through axial bores M and N in sleeves 319 and 320 of respective rib segments 112 and 113. The plates are rotatably joined to strut 15 by way of pin 329 which extends through axial bore T in the plates and the strut, as shown.

The rib segment-to-strut hinge further includes respective rotatable connections to respective pairs of rod members 262 and 342 that extend in spaced-apart relationship with rib segments 112 and 113, to effectively form therewith part of a pair of fourbar linkages which include the plates of the hinge joints at the opposite ends of rib segments 112 and 113. Each of rod members 262 is rotatably coupled to plates 311, 312 by way of pins 322 extending through axial bores P, while each of rod members 342 is rotatably coupled to plates 311, 312 by way of pins 326 extending through axial bores Q in the plates and rod members, as shown.

The detailed configuration of the rib segment-to-strut hinge joint of FIGS. 13-15 represents its condition for the stable, fully deployed state of the support structure, as illustrated in FIGS. 9A and 9B, described above.

When folded away from the state shown in FIGS. 13-15, rib segments 112 and 113 rotate in opposite counterclockwise and clockwise directions, respectively, about axial bores M and N, as denoted by arrows AM and AN in FIG. 13. Rotation arrows AP, AQ, AR and AS show the direction of rotation of the other components joint 204 in the course of stowage from its fully deployed state.

FIGS. 16 and 17 diagrammatically illustrate respective partially deployed and stowed states of serially interconnected rib segments 111 ... 114, struts 102 and cords 103 relative to central hub 101 of the truss support framework shown in FIGS. 9A and 9B (absent the rod members of the fourbar linkages in order to simplify the drawing). As will be appreciated from the above description of FIGS. 10-15 and the deployment/stowage sequence shown in FIGS. 16 and 17, the truss support structure upon which the multi-panel gores of the solar concentrator are mounted is capable of being stowed in a volumetrically compact condition thereby facilitating its transport from launch site to a space deployed location. Preferably, the hub-hinged ends of the fourbar linkages of the respective ribs of the truss structure (not shown in FIGS. 16 and 17) are coupled to a controllable drive mechanism (engaged through hub 101), so as to enable the entire truss support structure and solar concentrator panels mounted thereon to be deployed about hub 101 to the condition shown in FIG. 1. In addition, because of the foldability of the individual panels of the concentrator between the tape members of each gore the panels themselves can be compactly contained within the stowed configuration of the truss support structure.

Figure 18:
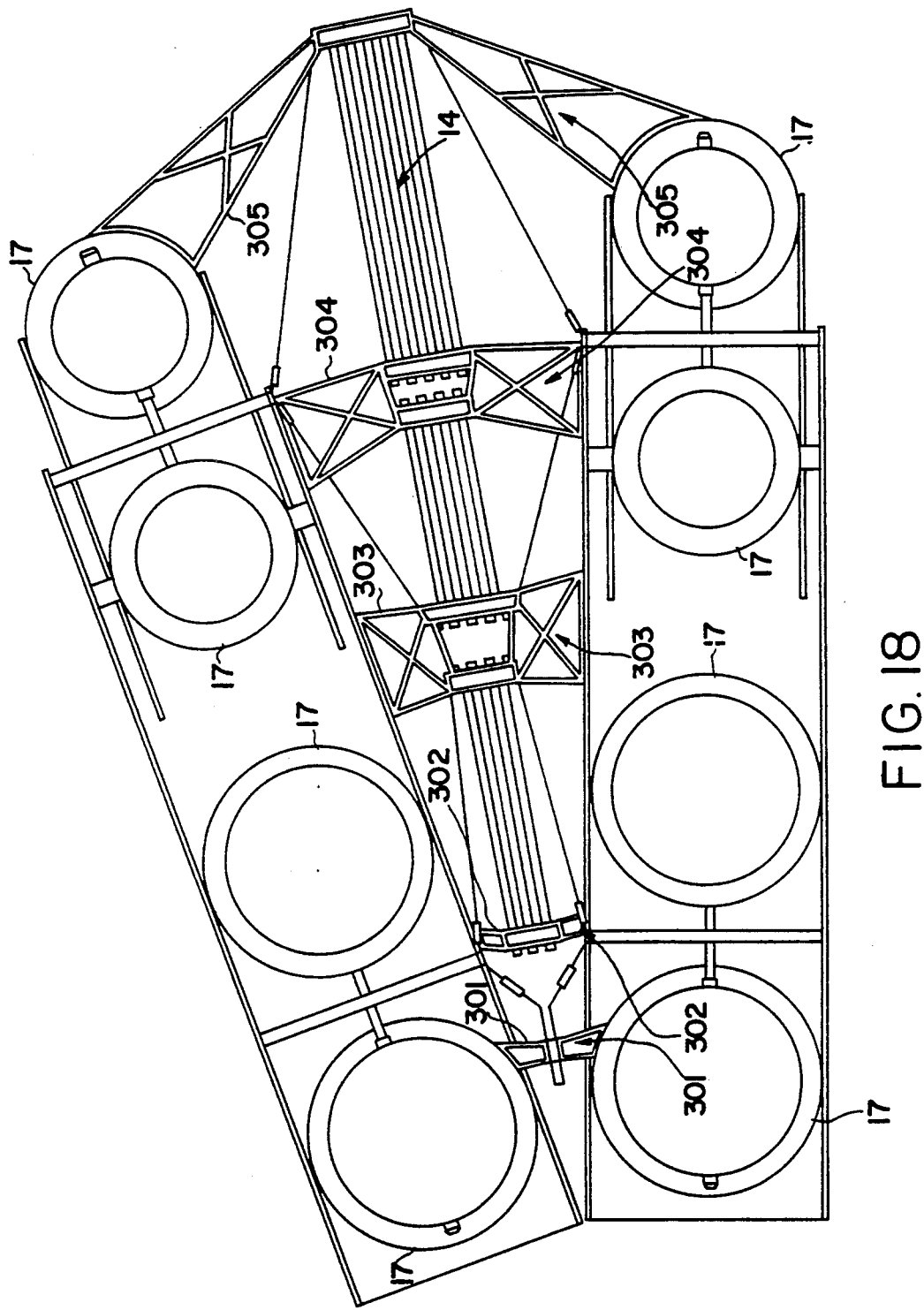
FIGS. 18 and 19 show the manner in which the splined radial panel concentrator of FIGS. 1 and 2 folds together in its stowed configuration.
Figure 19:
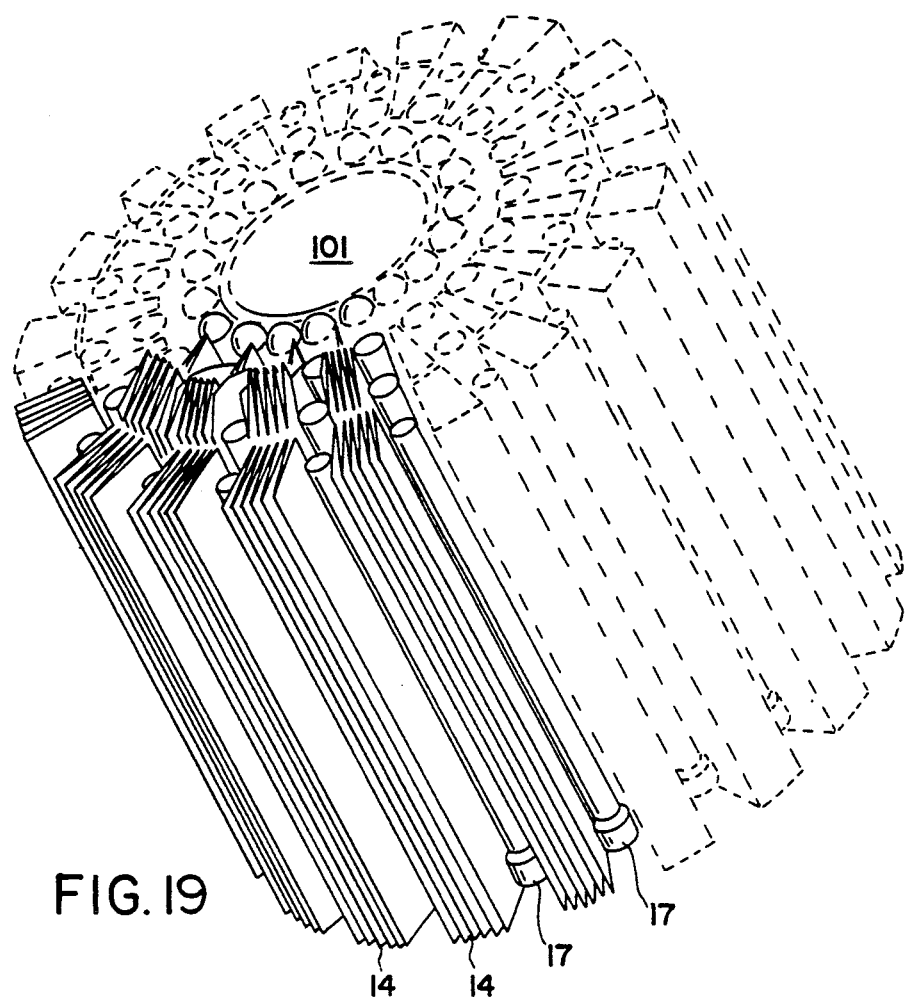

More particularly, as shown in FIGS. 18 and 19, the respective panels of a radial section of a gore are circumferentially foldable and interleave with one another in a zig-zag (accordion-like) manner between a respective stowed pair of tape members and their associated mutually aligned ribs of the support framework 16. The respective segments of which the ribs are comprised are shown in FIGS. 18 and 19 as being grouped in sets or pairs so as to provide for the interleaving of pairs of radial panel sections therebetween. Also shown in FIG. 18 are sets of vibration absorbing stowage restraints 301-305 which are provided on the sides of the hinge side plates linkages of the rib segments so as to face the circumferential direction in which the panels fold to their stowed state. These vibration absorbing stowage restraints engage the side portions of the panels whereat the tie down fasteners 65 are located. Preferably, atop the upper cap portions 72 of the fasteners vibration cushioning snubbers are provided so as to form protective standoffs between the panels in their folded, stowed state.

In its stowed configuration for launch, shown in FIG. 19, the structure is folded at the hinges of the support framework, with the ribs being retracted to a nested arrangement about the central hub. Because the ribs are retracted, structural cords are no longer in tension and do not impart shaping loads to the reflective panels. The panels strips assume their natural flat shape and are folded accordion style between the ribs. As a consequence, the cargo volume occupied by the concentrator aboard a space shuttle or other launch vehicle is efficiently utilized.

Figure 20:
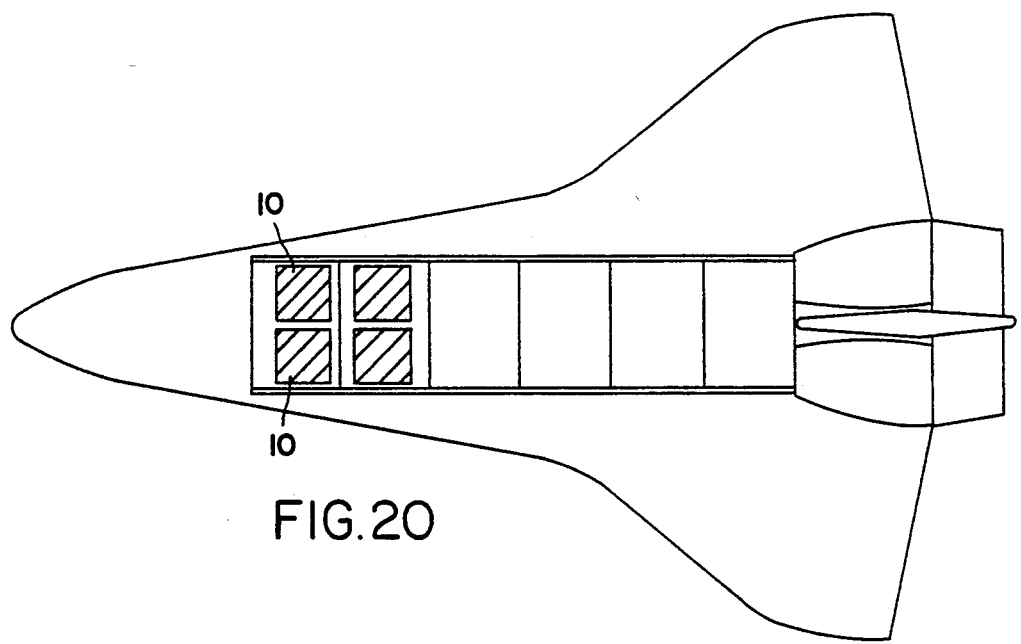
FIG. 20 diagrammatically shows the manner in which the solar concentrator structure of the present invention may be stowed as cargo aboard a space shuttle launch vehicle.

FIG. 20 diagrammatically depicts how four (fifteen meter) splined radial panel concentrators in accordance with the present invention occupy less than one third of available cargo bay space thereby allowing simultaneous launch of other payloads.

As will be appreciated from the foregoing description, the present invention obviates the shortcomings of conventional compound curved solar energy concentrator assemblies by an improved solar collector structure through which compound curvature surfaces are approximated by a three-dimensional arrangement of compactly stowable flat panel segments mounted on a collapsible, space-deployable support structure of linear components. This improved solar energy collector structure includes an underlying self-deployed support framework and a semirigid reflective surface structure attached to the support framework. With the curvilinear configuration being approximated by flat panels which are curved only in the radial direction (radial tension being created by the outer perimeter anchoring of flexible radial tapes, contour equilibration is obtained. Adjacent panels are interconnected to a flexible tensioned cord structure circumferentially bridging the curvilinearly shaped tape members, thereby approximating the desired circumferential circular shape of the reflector surface.

While we have shown and described an embodiment in accordance with the present invention, it is to be understood that the same is not limited thereto but is susceptible to numerous changes and modifications known to a person skilled in the art, and we therefore do not wish to be limited to the details shown and described herein but intend to cover all such changes and modifications as are obvious to one of ordinary skill in the art.

What is claimed is:

1. For use with a support framework capable of encompassing a contoured surface, an energy directing structure supported thereby, comprising:
   a plurality of energy directing panel strips each of which is substantially flat is an unflexed condition and has substantial in-plane mechanical stiffness in a first direction and is capable of being flexed in a second direction;
   first means for connecting plural ones of said panel strips to said support framework so that said panel strips are arranged in a side-by-side relationship in said first direction; and
   second means for connecting said panel strips to said support framework in a second direction along said panel strips such that said panel strips are flexed along said second direction so as to be two-dimensionally contoured therealong;
   whereby, said plural panel strips piecewise-appropriate a multidimensionally contoured energy directing surface support by support framework.

2. A structure according to claim 1, wherein said first means comprises means for connecting said panel strips to said support framework such that, as arranged in said side-by-side relationship, said panel strips form a piecewise twodimensionally contoured energy directing surface in said first direction.

3. A structure according to claim 2, wherein said second means comprises a plurality of first link means extending in said second direction and being spaced apart from one another in said first direction, said first link members being attached to said support framework so as to be contoured in said second direction, and wherein said first means comprises a plurality of second link members extending in said first direction between said first link members and being space apart from one another in said second direction.

4. A structure according to claim 3, wherein said first means comprises means, for attaching a respective panel strip to a second link member, and said second comprises means for attaching a respective panel strip to a plurality of said second link members at a plurality of spaced apart locations thereof separated from one another in said second direction.

5. A structure according to claim 4, wherein each of said second link members comprises a catenary cord structure bridging a pair of spaced apart first link members.

6. A structure according to claim 5, wherein said attaching means of said first and second means comprise tie members connecting said panel strips to said catenary cord structure.

7. A structure according to claim 1, wherein said first direction lies along a circumferential, portion of a surface of revolution about an axis and said second direction lies along a radial line on said surface.

8. A structure according to claim 4, wherein said first direction lies along a circumferential portion of a surface of revolution about an axis and said second direction lies along a radial line on said surface.

9. A structure according to claim 8, wherein said support framework contains a plurality of spaced apart rib members radially extendable to encompass said contoured surface, and wherein said plurality of first link members extend radially in mutually aligned relationship with respective ones of said rib members, each first link member being connected to a respective rib member at a plurality of locations distributed therealong.

10. A structure according to claim 9, wherein said second link members comprise a plurality of circumferentially extending link members interconnecting respective pairs of mutually aligned rib and first link members.

11. A structure according to claim 10, wherein each of said second link members comprises a catenary cord structure bridging a pair of spaced apart first link members.

12. A structure according to claim 11, wherein said attaching means of said first and second means comprise tie members connecting said panel strips to said catenary cord structure.

13. A structure according to claim 10, further including means for placing said radially extending first link members in tension in a radial direction, so that the connection of a first link member to a rib member causes said radially extending first link members to be effectively contoured in the radial direction.

14. A structure according to claim 13, wherein each of said second link members comprises a catenary cord structure bridging a pair of spaced apart first link members.

15. A structure according to claim 14, wherein said attaching means of said first and second means comprise tie members connecting said panel strips to said catenary cord structure.

16. A structure according to claim 15, wherein a respective catenary cord structure is comprised of a pair of circumferentially extending cord members respectively interconnecting the rib and first link members between which a panel strip is supported.

17. A structure according to claim 16, wherein a respective second link member includes a plurality of tensioned tie members interconnecting said pair of cord members at spaced apart locations distributed therealong.

18. A structure according to claim 17, including means for attaching said panel strips to said second link members at the spaced apart locations of said pairs of cord members at which said tensioned tie members are interconnected.

19. A structure according to claim 18, wherein said attaching means includes means for accommodating for changes in expansion and contraction of said panel strips so as to maintain the effective shape of said structure.

20. A structure according to claim 19, wherein said attaching means comprises means for permitting relative radial translation between said tie members and said panel strips at the locations of attachment thereof.

21. A structure according to claim 20, wherein each of said panel strips comprises a generally rectangularly shaped flat reflective element having its longitudinal dimension extending in the radial direction and its narrow dimension extending in the circumferential direction.

22. A structure according to claim 21, wherein each of said energy directing surface is defined by a plurality of said panel strips distributed in the radial direction and a plurality of said panel strips distributed in the circumferential direction, so as to be arranged in an end-to-end and a side-by-side relationship.

23. A structure according to claim 22, wherein said panel strips are foldable with one another in an accordion-like manner, whereby said folded panel strips may be stowed in a compact nested arrangement.

24. A structure according to claim 9, wherein each of said rib members is comprised of a plurality of interconnected rib segments which are foldably collapsible in the radial direction and said first link members comprise tape members coupled to said rib members so as to be foldably collapsible with said rib member segments.

25. A structure according to claim 24, wherein the lengths of said panel strips in the radial direction effectively correspond to the lengths of said rib segments, so that panel strips the sides of which are adjacent to one another fold in alignment with and between rib segments.

26. A structure according to claim 25, wherein each first link member is formed of a respective flexible tape member coupled to a perimeter portion of a rib member aligned therewith and extending toward an apex portion of said structure and foldable at separations between first link member segments, and arranged to accommodate the folding and stowage panels of a respective panel section.

27. A structure according to claim 26, further including means for preventing the reflective surfaces of said panel strips from contacting one another when said panel strips are folded into a stowed and nested arrangement.

28. A structure according to claim 27, wherein said preventing means comprises respective vibration absorbing elements coupled with said panel strips at the spaced apart locations thereof whereat said attaching means attach tie members to said panel strips.

29. A structure according to claim 28, further including vibration absorbing means coupled to said rib segments and arranged to engage said panel strips in their folded and nested condition.

30. For use with a support framework containing a plurality of spaced apart interconnected rib segments radially deployable from a central hub so as to encompass a three-dimensional contoured surface, a structure for supporting a multiplicity of energy reflecting panels in the shape of a prescribed contoured surface of revolution comprising:
- a plurality of radially extendible and tensionable tapes respectively disposed in spaced apart relationship and mutually aligned with respective interconnected rib segments;
- a plurality of rib segment-to-tape ties connecting each radially extendible tape to a respective rib segment at a plurality of locations distributed therealong;
- a plurality of circumferentially extending cord pairs interconnecting respective pairs of mutually aligned rib segments and tapes; and
- a plurality of panel sections, each respective panel section being coupled to cord pairs so as to be supported thereby between respective pairs of mutually aligned rib segments and tapes.

31. A structure according to claim 30, further including means for placing said radially extendible tapes in tension in a radial direction, so that said rib segment-to-tape ties cause said radially extendible tapes to be effectively curvilinearly contoured in the radial direction.

32. A structure according to claim 31, including means for connecting each panel section to a plurality of said circumferentially extending cord pairs so that, in the radial direction each panel section is effectively curvilinearly contoured to conform with the curvilinear contour of said tensioned tapes.

33. A structure according to claim 32, wherein each of said panels comprises a generally rectangularly shaped flat reflective element having its longitudinal dimension extending in the radial direction of a panel section and its narrow dimension extending in the circumferential direction thereof.

34. A structure according to claim 33, wherein each of said circumferentially extending cord pairs is curvilinearly contoured in the circumferential direction and wherein each of said panel sections is comprised of a plurality of panels extending generally in the radial direction and arranged in a side-by-side relationship in the circumferential direction between respective ones of said tapes, each panel being attached to a plurality of said circumferentially extending cord pairs, so as to be effectively contoured in the radial direction and so that each panel section generally conforms with the circumferential curvilinear contour of said cord pairs.

35. A structure according to claim 34, wherein a respective cord pair includes a plurality of tensioned tie members interconnecting said pair of cords at spaced apart locations distributed therealong.

36. A structure according to claim 35, including means for attaching said panels to said cord pairs at the spaced apart locations thereof at which said tensioned tie members are interconnected.

37. A structure according to claim 36, wherein said attaching means includes means for accommodating for changes in expansion and con-traction of said panels so as to maintain the effective shape of said structure.

38. A structure according to claim 37, wherein said attaching means comprises means for permitting relative radial translation between said tie members and said panels at the locations of attachment thereof.

39. A structure according to claim 34, wherein each of said panel sections comprises a plurality of said panels distributed in the radial direction and a plurality of said panels distributed in the circumferential direction so as to be arranged in an end-to-end and a side-by-side relationship.

40. A structure according to claim 39, wherein, within a panel section, panels the sides of which are adjacent to one another are foldable with one another in an accordion-like manner, whereby said folded panels may be stowed in a compact nested arrangement.

41. A structure according to claim 40, wherein said rib segments are foldably collapsible in the radial direction and said tapes are coupled to said rib segments so as to be foldably collapsible with said rib segments.

42. A structure according to claim 41, wherein the lengths of said panels in the radial direction effectively correspond to the lengths of said rib segments, so that panels the sides of which are adjacent to one another within a panel section fold in alignment with and between rib segments.

43. A structure according to claim 42, further including means for preventing the reflective surfaces of said panels from contacting one another when said panels are folded into a stowed and nested arrangement.

44. A structure according to claim 43, wherein said preventing means comprises respective vibration absorbing elements coupled with said panels at the spaced apart locations thereof whereat said attaching means attach said tie members to said panels.

45. A structure according to claim 44, further including vibration absorbing means coupled to said rib segments and arranged to engage said panels in their folded and nested condition.

* * * * *